United States Patent
Schmid

(10) Patent No.: US 10,865,575 B2
(45) Date of Patent: Dec. 15, 2020

(54) BRACKET SCAFFOLD

(71) Applicant: Peri GmbH, Weissenhorn (DE)

(72) Inventor: Josef Schmid, Balzheim (DE)

(73) Assignee: PERI GMBH, Weissenhorn (DE)

( * ) Notice: Subject to any disclaimer, the term of this patent is extended or adjusted under 35 U.S.C. 154(b) by 112 days.

(21) Appl. No.: 15/783,913

(22) Filed: Oct. 13, 2017

(65) Prior Publication Data

US 2018/0106053 A1   Apr. 19, 2018

(30) Foreign Application Priority Data

Oct. 14, 2016   (DE) .......................... 10 2016 220 051

(51) Int. Cl.
| | |
|---|---|
| *E04G 3/20* | (2006.01) |
| *E04G 5/04* | (2006.01) |
| *E04G 3/24* | (2006.01) |
| *F16M 13/02* | (2006.01) |

(52) U.S. Cl.
CPC .............. *E04G 5/046* (2013.01); *E04G 3/20* (2013.01); *E04G 3/243* (2013.01); *F16M 13/022* (2013.01)

(58) Field of Classification Search
CPC ........ F16M 13/022; E04G 5/046; E04G 3/20; E04G 3/243
USPC .... 248/240, 235, 239, 250; 182/82, 45, 152, 182/224
See application file for complete search history.

(56) References Cited

U.S. PATENT DOCUMENTS

| | | | | |
|---|---|---|---|---|
| 4,611,784 A | * | 9/1986 | Gallis | ........................ E04G 5/04 249/20 |
| 6,003,630 A | * | 12/1999 | Whalen | ..................... E04G 3/20 182/82 |
| 9,072,380 B2 | * | 7/2015 | Durgin | ................... A47B 96/06 |

FOREIGN PATENT DOCUMENTS

| | | | |
|---|---|---|---|
| DE | 19 94 842 U | 10/1968 | |
| DE | 10 2005 030 333 A1 | 1/2007 | |
| DE | 102005030333 A1 * | 1/2007 | ............ E04G 11/20 |
| DE | 20 2016 103 596 U1 | 8/2016 | |
| EP | 0 064 183 A2 | 11/1982 | |
| EP | 2 060 706 A2 | 5/2009 | |
| EP | 3 034 870 A1 | 6/2016 | |

\* cited by examiner

*Primary Examiner* — Todd M Epps
(74) *Attorney, Agent, or Firm* — Hackler Daghighian Martino & Novak

(57) ABSTRACT

A bracket scaffold for arrangement on a curved surface of a structure includes a first securing element arranged on the structure. The bracket scaffold has an end-side first coupling element which is, in particular in a limited manner, pivotably arranged on a first carrier of the bracket scaffold. A rotation axis of the first coupling element preferably intersects with the support location of the first coupling element on the first securing element. The pivot radius of the first coupling element describes in particular a concave pivot arc on the first carrier. The rotation axis is located from the first guide preferably in the direction of the free end of the first coupling element. Extension torques in the articulation, which is formed by the first guide, are minimized by the bracket scaffold being pulled away from the structure.

21 Claims, 4 Drawing Sheets

C-C

BRACKET SCAFFOLD

CROSS-REFERENCE TO RELATED APPLICATIONS

This application claims priority to German Patent Application No. 10 2016 220 051.8, filed Oct. 14, 2016, the entire contents of which are hereby incorporated by reference.

DESCRIPTION

Field of the Invention

The invention relates to a bracket scaffold for securing to a curved surface of a structure. The invention further relates to a method for arranging a bracket scaffold on a structure.

Background of the Invention

It is known to secure bracket scaffolds, for example, of climbing formworks, to curved building walls. To this end, there are provided special constructions which have on the bracket scaffold fixedly adjusted angles which are adapted to the respective building radius. Alternatively, it is known to provide an articulation on a securing element which is securely connected to the building wall in order to achieve an adaptation to the abutment face of the bracket scaffold. However, these known securing elements are heavy and cumbersome to assemble. Furthermore, as a result of the known articulations, large torques are often produced at the suspension location as a result of forces on the bracket scaffold, for example, in the event of large wind loads.

An object of the present invention is in this regard to provide a bracket scaffold which can be assembled to the greatest possible extent in a flexible manner on a curved building surface, in particular with high extension torques being prevented. An object of the invention is further to provide a method for flexible but nonetheless mechanically stable assembly of a bracket scaffold.

SUMMARY OF THE INVENTION

The object is achieved according to the invention with a bracket scaffold having the features of the apparatus claims and by a method having the features of the method claims. Advantageous developments are set out in the dependent claims.

The object according to the invention is consequently achieved by a bracket scaffold for securing to a curved surface of a structure, wherein the bracket scaffold has a first carrier and a first coupling element which is arranged on the first carrier and a first guide for moving the first coupling element relative to the first carrier. The first coupling element can be pivoted about a (virtual) rotation axis on the first carrier.

An articulation is formed as a result of the first guide. The articulated connection of the first coupling element to the first carrier enables a structurally significantly simplified construction of the securing element. At the same time, the bracket scaffold can be adapted in a flexible manner to differently curved building surfaces.

The pivot arc of the first coupling element is in this instance from the perspective of the first coupling element preferably constructed in a convex manner. From the perspective of the portion of the carrier facing away from the coupling element, the pivot arc is constructed in a concave manner on the first carrier. The (virtual) rotation axis is located in the region of the free end of the first coupling element, that is to say, close to the structure, in particular at the free end of the first coupling element.

Preferably, the above-discussed (virtual) rotation axis of the first guide does not intersect with the carrier. The rotation axis of the first guide extends in the assembled state of the bracket scaffold preferably vertically ±20°, preferably vertically ±10°, preferably vertically ±5°. The first guide preferably enables only a pivoting of the first coupling element relative to the first carrier about the first rotation axis.

Extension torques in the articulation which can be produced by means of tensile forces on the first carrier are thereby significantly reduced. Furthermore, the connection location of the first coupling element with respect to the first securing element practically does not move when the first coupling element is pivoted relative to the first carrier. The spacings of the connection locations of the securing elements with respect to the structure can thereby—regardless of the curvature of the structure—be selected to be substantially equidistant.

Preferably, the rotation axis of the first guide is located in the region of the first securing element. A pivoting of the first coupling element relative to the first carrier thereby at most changes in a minimal manner the offset of the first securing element relative to the first carrier.

In a further preferred manner, the rotation axis of the first guide is located in the support region of the first coupling element on the first securing element. In this particularly preferred embodiment of the invention, extension torques in the articulation are practically eliminated and the spacings of the support regions can be selected to be equidistant.

In order to connect the first coupling element to the first securing element, the first coupling element may have a first slotted receiving member for partially receiving the first securing element. The first slotted receiving member is preferably constructed to be U-shaped, wherein the U-shape in the assembled state of the first coupling element is open in a downward direction. The opened first slotted receiving member enables the first coupling element to be placed on the first securing element, for example, using a crane.

The first coupling element preferably has at the free end thereof for contact with the structure a first front plate which, when the bracket scaffold is pressed onto the structure, is orientated towards the surface of the structure. The first slotted receiving member is preferably constructed in the first front plate.

Preferably, the first guide is constructed in the form of a slotted guide. The slotted guide has in this instance a first slotted member and a first guiding member which is guided in the first slotted member.

In a further preferred manner, the first guide in the form of a slotted guide has a second slotted member and a second guiding member which is guided in the second slotted member.

The first slotted member and/or the second slotted member is/are preferably constructed to be closed in a plane.

The first guide preferably enables a pivoting of the first coupling element on the first carrier through ±30°, in particular through ±20°, preferably through ±15°.

In order to be able to dissipate tensile forces acting on the first coupling element in a reliable manner into the first carrier, the first guiding member is preferably partially in abutment with the first slotted member in a planar manner. Alternatively or additionally, the second guiding member may be partially in abutment with the second slotted member in a planar manner.

The partially planar abutment of the first guiding member or the second guiding member is in a structurally preferred manner formed by the first guiding member in the form of a polygon or the second guiding member in the form of a polygon.

The first carrier may be constructed in one piece. Preferably, the first carrier has a first adapter portion and a first bolt (bar, beam). The first coupling element is in this instance connected by the first guide to the first adapter portion. The first adapter portion can be secured to the first bolt in a reversibly releasable manner. The first coupling element can thereby be removed from the first bolt together with the first adapter portion so that the bracket scaffold can be secured directly to the first bolt at a straight surface of a structure.

The first adapter portion may be connected to the first bolt by a first socket pin connection. The first socket pin connection has in this instance a first adapter socket pin which can be introduced into a first carrier opening. The first socket pin connection enables reliable and rapid assembly of the first adapter portion on the first bolt.

Preferably, the first carrier opening is in this instance constructed in the form of a keyhole, wherein the first adapter socket pin has a first adapter socket pin projection which is constructed for engaging behind the edge of the first carrier opening. The first adapter socket pin can thereby be secured without a separate split pin.

The first coupling element may have a first coupling element socket pin for securing the first securing element to the first coupling element. The first coupling element socket pin can in this instance be introduced into a first coupling element opening of the first coupling element. The first coupling element socket pin enables rapid and reliable assembly of the first coupling element on the first securing element.

The first coupling element opening may be constructed in the form of a keyhole, wherein the first coupling element socket pin has a first coupling element socket pin projection for engaging behind the edge of the first coupling element opening. The first coupling element socket pin may thereby be secured without a separate securing split pin.

The bracket scaffold may have a first additional opening for storing the first coupling element socket pin when the first coupling element socket pin is not located in the first coupling element opening. The first coupling element socket pin is thereby always ready to hand. The first additional opening is preferably constructed in a geometrically identical manner to the first coupling element opening.

The bracket scaffold preferably has a second carrier and a second coupling element which is arranged on the second carrier, wherein the second coupling element is constructed for connection to a second securing element. The second securing element can be arranged on the structure. The bracket scaffold further has in this instance a second guide for the, in particular concave, pivoting of the second coupling element on the second carrier so that the rotation axis of the second guide is preferably also located close to the structure. Generally, the rotation axis of the second guide preferably has the same properties as the rotation axis of the first guide. The second carrier is rigidly connected to the first carrier. The bracket scaffold can consequently be secured at two locations, that is to say, at two securing elements, to the curved surface of a structure. Both the first coupling element and the second coupling element can in this instance be pivoted relative to the curved surface of the structure, in particular without tensile forces acting on the bracket scaffold in the form of significant torques at the suspension location.

The second carrier may be constructed in a mirror-inverted manner or identically with respect to the first carrier. Alternatively or additionally, the second coupling element may be constructed in a mirror-inverted manner or identically with respect to the first coupling element. Alternatively or additionally, the second securing element may be constructed in a mirror-inverted manner or identically with respect to the first securing element. Alternatively or additionally, the second guide may be constructed in an identical or mirror-inverted manner with respect to the first guide.

In the region of the rotation axis of the first guide and/or in the region of the rotation axis of the second guide, an additional rotation axis or axes may be provided so that the first coupling element and/or the second coupling element can be adapted to a structure in the form of a dome.

The object according to the invention is further achieved by a method for arranging a bracket scaffold on a structure, wherein the bracket scaffold has a first securing element, a first carrier, a coupling element which is arranged on the first carrier and a guide of the first coupling element on the first carrier. The method has the following method step:

A) pressing the bracket scaffold onto the structure so that the coupling element is orientated towards the surface of the structure, wherein the rotation axis of the first guide is preferably located in the region of the free end of the first coupling element.

The method preferably further has the following method step:

B) lowering the bracket scaffold with the first securing element being partially received in the first coupling element.

The method according to the invention is preferably carried out with a bracket scaffold according to the above description or according to the claims.

BRIEF DESCRIPTION OF THE DRAWINGS

Other features and advantages of the invention will be appreciated from the following detailed description of an embodiment of the invention, from the claims and with reference to the Figures of the drawings which show inventively significant details. The different features can be implemented individually per se or together in any combinations in variants of the invention. The features shown in the drawings are illustrated in such a manner that the special features according to the invention can be made clearly visible.

In the drawings:

FIG. 5b is a side view of the bracket scaffold according to FIG. 5a; and

DETAILED DESCRIPTION OF THE PREFERRED EMBODIMENTS

Figure 1:
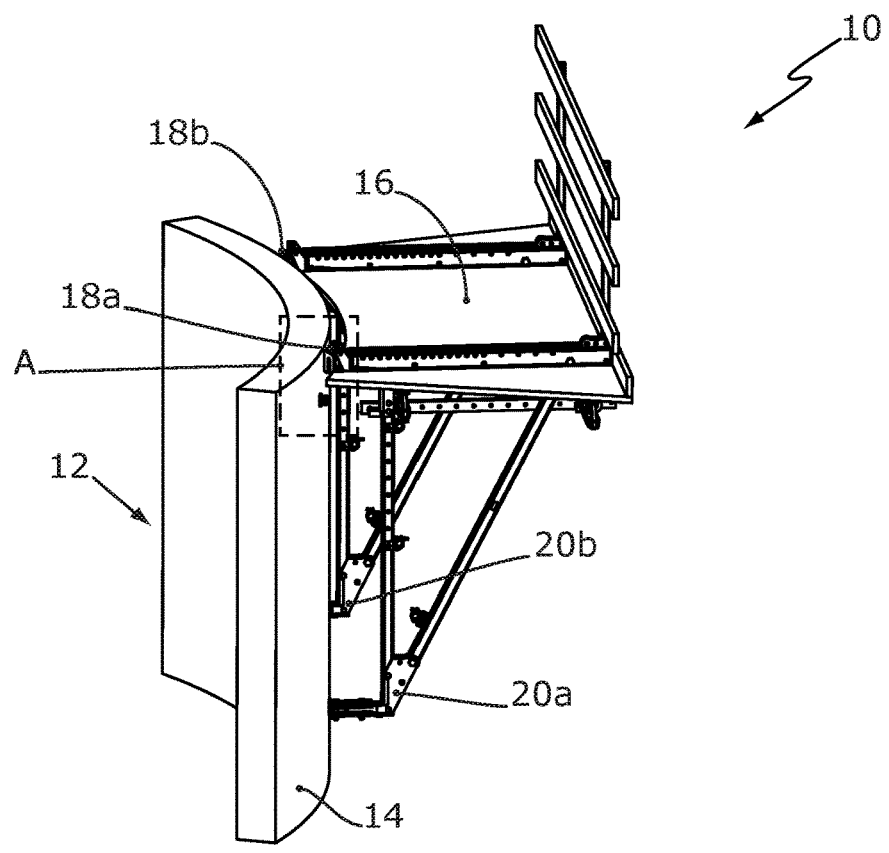
FIG. 1 is an isometric illustration of a bracket scaffold on a structure with a curved surface.

FIG. 1 shows a bracket scaffold 10 for arranging on a structure 12. The structure 12 has a curved surface 14 on which the bracket scaffold 10 can be arranged.

The bracket scaffold 10 has a platform 16. A formwork (not shown) can be arranged on the platform 16 in order to raise the structure 12. The bracket scaffold 10 can be arranged on the structure 12 by means of suspension locations 18a, 18b. Furthermore, the bracket scaffold 10 is supported on the structure 12 by means of struts 20a, 20b. The bracket scaffold 10 can be moved by means of a crane (not shown).

Figure 2A:
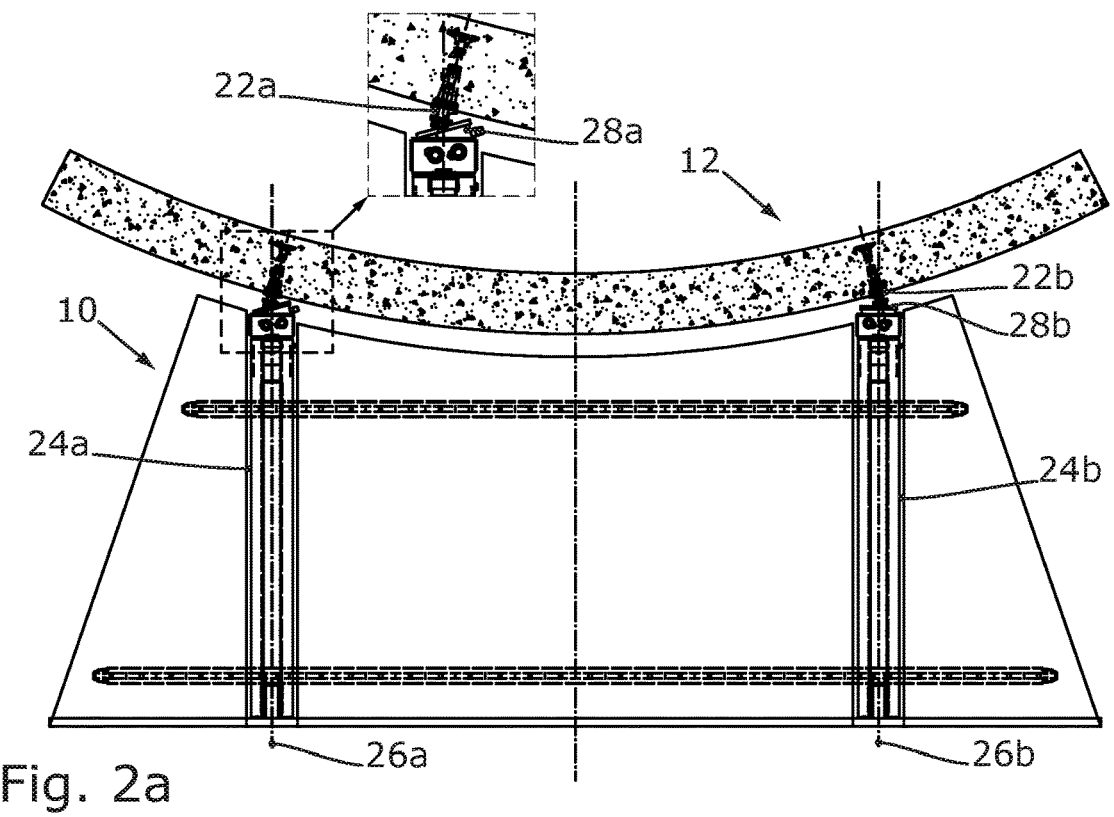
FIG. 2a is a plan view of the bracket scaffold according to FIG. 1 with an enlarged partial illustration.

FIG. 2a shows the bracket scaffold 10 before it is definitively secured to the structure 12. A first securing element 22a and a second securing element 22b are arranged on the structure 12. The securing of the bracket scaffold 10 to the structure 12 is carried out substantially by suspending the bracket scaffold 10 on the securing elements 22a, 22b.

The bracket scaffold 10 has a first carrier 24a and a second carrier 24b. The longitudinal axes 26a, 26b of the carriers 24a, 24b extend parallel with each other in order to facilitate the displacement of a formwork (not shown) on the bracket scaffold 10 parallel with the carriers 24a, 24b.

At the end of the carriers 24a, 24b facing the structure 12, the first carrier 24a is connected to a first coupling element 28a or the second carrier 24b is connected to a second coupling element 28b. The coupling elements 28a, 28b can be pivoted in a limited manner in a plane which extends between the carriers 24a, 24b in order to enable reliable securing of the bracket scaffold 10 to the structure 12. In the position shown in FIG. 2a, that is to say, before the bracket scaffold 10 is pressed onto the structure 12, the coupling elements 28a, 28b can still be orientated freely—within the pivot range thereof—relative to the structure 12.

Figure 2B:
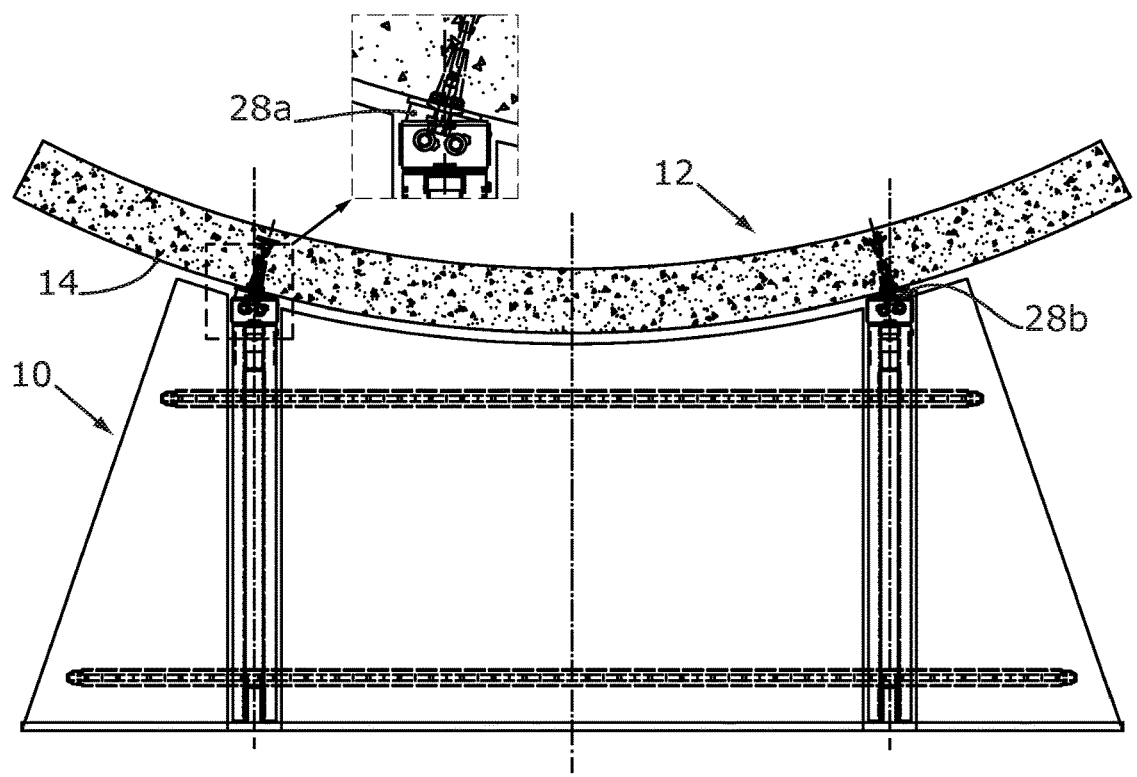
FIG. 2b is another plan view of the bracket scaffold according to FIG. 1 with an enlarged partial illustration after pressing the bracket scaffold onto the curved surface of the structure.

FIG. 2b shows the bracket scaffold 10 after, in particular in a state suspended on a crane (not shown), it has been pressed against the structure 12. FIG. 2b shows that the first coupling element 28a and the second coupling element 28b are orientated along the curved surface 14 of the structure 12.

Figure 3:
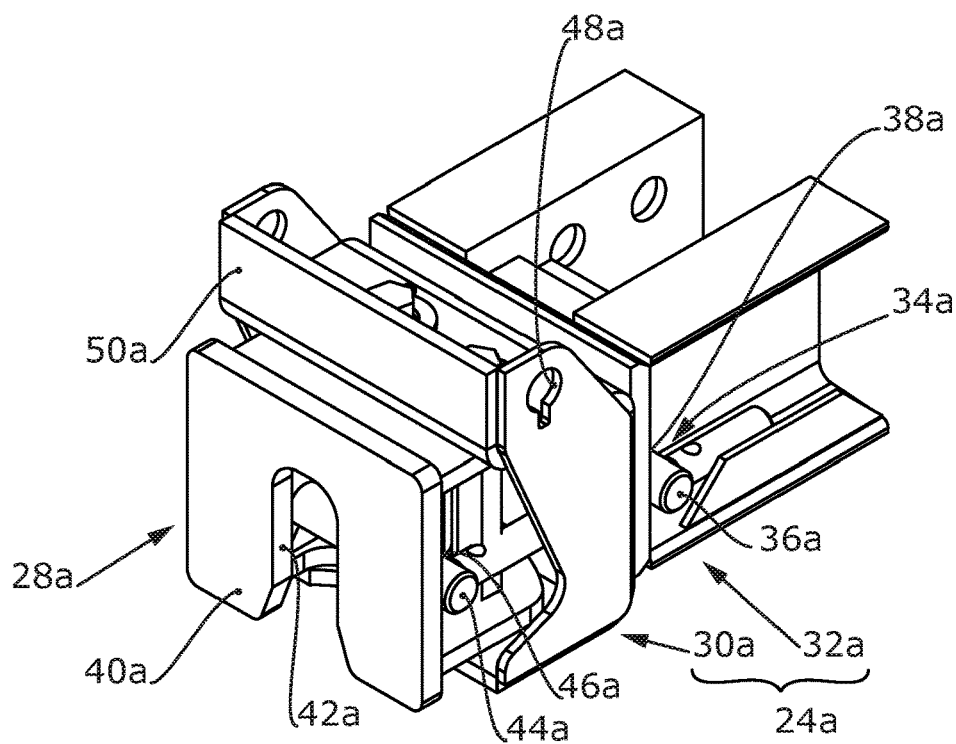
FIG. 3 is an isometric illustration of a portion of the bracket scaffold according to FIGS. 1 to 2b.

FIG. 3 shows a portion of the first carrier 24a which has a first adapter portion 30a and a first bolt (bar, beam) 32a. The first coupling element 28a can be pivoted relative to the first adapter portion 30a. However, the first adapter portion 30a is securely connected to the first bolt 32a. The connection between the first adapter portion 30a and the first bolt 32a is carried out by means of a first socket pin connection 34a. The first socket pin connection 34a has a first adapter socket pin 36a which is partially introduced into a first carrier opening 38a.

The first coupling element 28a has at the end side a first front plate 40a which, when the bracket scaffold 10 (see FIG. 2b) is pressed onto the structure 12, is orientated towards the curved surface 14 of the structure 12. The first coupling element 28a has a first slotted receiving member 42a which in this instance is formed in the first front plate 40a. The first slotted receiving member 42a is—in the assembled state of the bracket scaffold 10 (see FIG. 2b)—open at the lower end in order to partially receive the first securing element 22a (see FIG. 2a). After the first securing element 22a has been partially received in the first slotted receiving member 42a, the first coupling element 28a can be secured to the first securing element 22a by means of a first coupling element socket pin 44a (see FIG. 2a). To this end, the first coupling element socket pin 44a can be partially introduced into a first coupling element opening 46a.

If the first coupling element socket pin 44a is not located in the first coupling element opening 46a, the first coupling element socket pin 44a can be introduced into a first additional opening 48a and thereby stored on the first coupling element 28a. The first additional opening 48a is constructed in a first curved retention member 50a of the first coupling element 28a by means of which the first adapter portion 30a can be readily handled together with the first coupling element 28a.

Figure 4A:
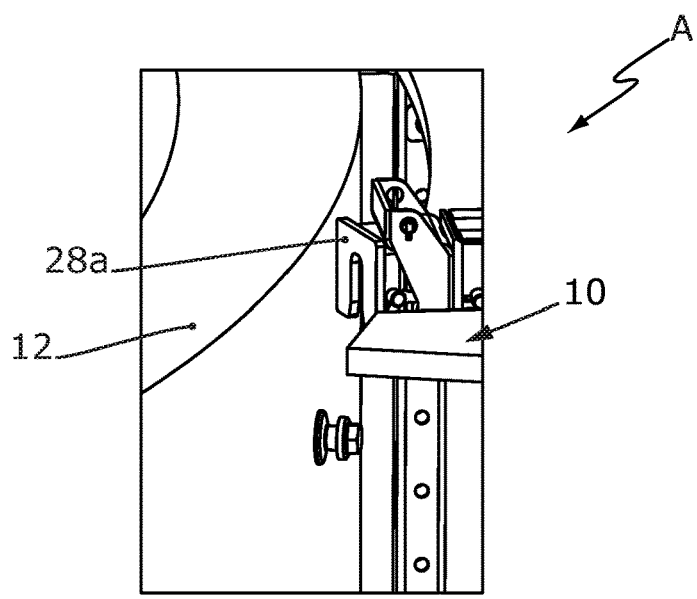
FIGS. 4a-4c are isometric part-illustrations of the bracket scaffold according to FIGS. 1 to 3 during the assembly thereof.

FIG. 4a shows the cut-out A according to FIG. 1. FIG. 4a shows that the first coupling element 28a is not yet orientated when the bracket scaffold 10 is moved closer to the structure 12.

Figure 4B:
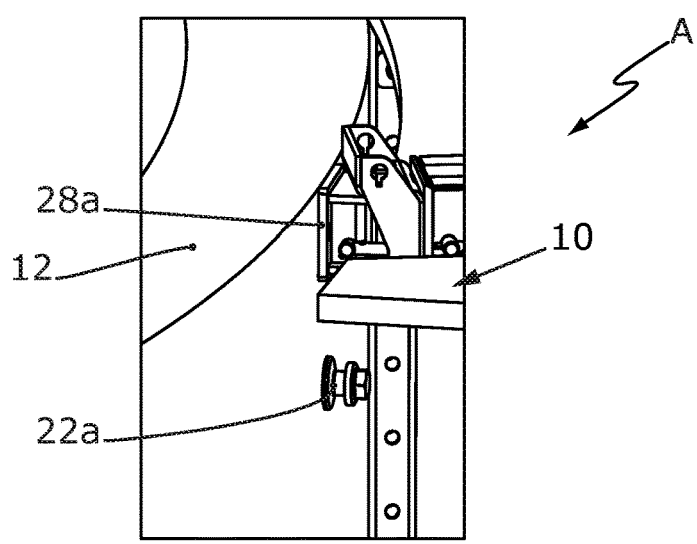

FIG. 4b shows the cut-out A after the first coupling element 28a has been pressed onto the structure 12, whereby the first coupling element 28a fits closely against the structure 12. Subsequently, the bracket scaffold 10 is lowered. In this instance, the first coupling element 28a is fitted onto the first securing element 22a.

Figure 4C:
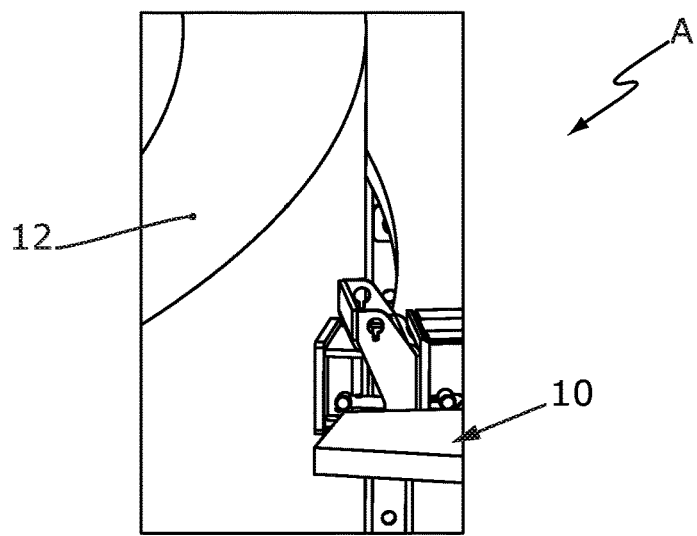

FIG. 4c shows the cut-out A, wherein the bracket scaffold 10 is lowered and securely locked to the structure 12.

FIGS. 4a to 4c show the method according to the invention, in which the bracket scaffold 10 is moved closer to the structure 12.

As a result of the contact of the bracket scaffold 10 with the structure 12, all the coupling elements of the bracket scaffold 10, in this instance the first coupling element 28a, are orientated towards the surface of the structure 12. After the orientation of the coupling elements, the bracket scaffold 10 is lowered, whereby the coupling elements are arranged on securing elements, in this instance the securing element 22a. Subsequently, at least one coupling element, in this instance the first coupling element 28a, in particular a plurality of coupling elements, preferably all the coupling elements, can be secured by means of a coupling element socket pin, in this instance the coupling element socket pin 44a, to the respective securing element.

Figure 5A:
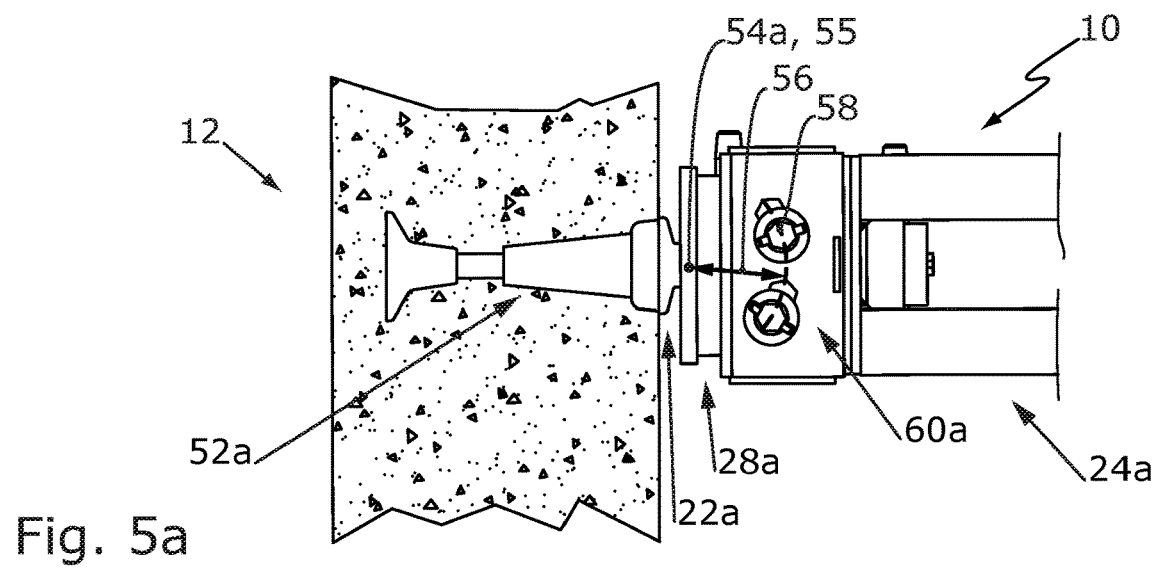
FIG. 5a is a partial plan view of the bracket scaffold which is mounted on the structure according to FIGS. 1 to 4c.

FIG. 5a shows a portion of the bracket scaffold 10 on the structure 12 according to FIG. 4c. FIG. 5a shows that the first securing element 22a is constructed in the form of a projection which is securely screwed by means of a screw to a first anchor 52a. The first coupling element 28a is supported on the first securing element 22a. The support of the first coupling element 28a is carried out at a first support location 54a of the first coupling element 28a. There extends through the first support location 54a at the same time the (virtual) rotation axis 55 of the first coupling element 28a relative to the first carrier 24a, which axis is in this instance illustrated as a dot in the plan view. A pivot radius 56 of the first coupling element 28a on the first carrier 24a is indicated by a double-headed arrow. A pivot arc 58 is produced by the pivoting of the first coupling element 28a and described by means of a dot-dash line. The pivot arc 58 is located in this instance in a concave manner in the first carrier 24a. The pivotability of the first coupling element 28a on the first carrier 24a is ensured by means of a first guide 60a.

Figure 5B:
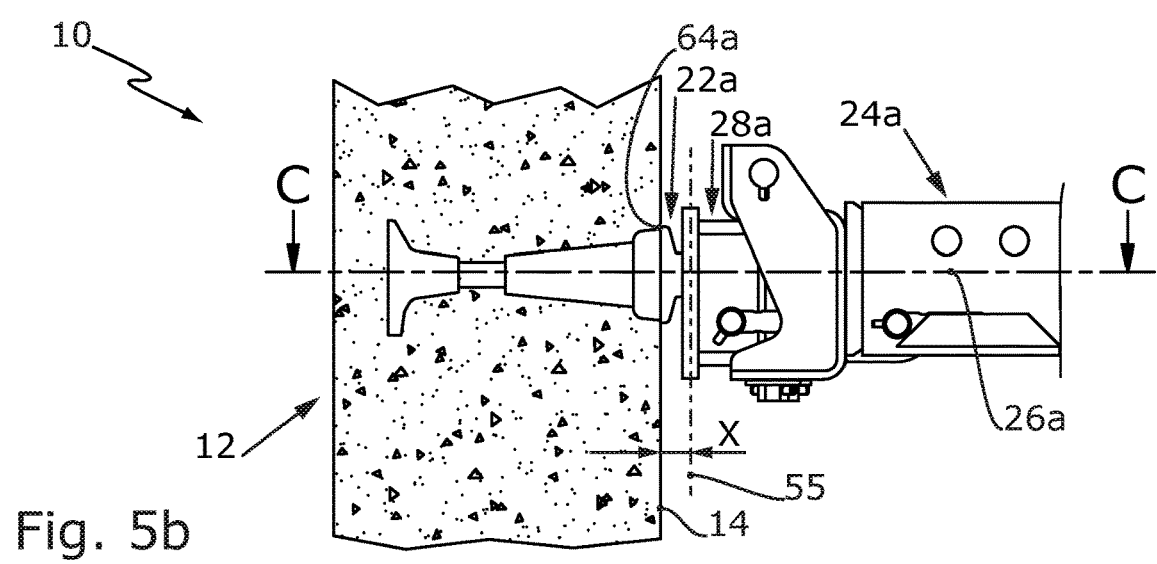

FIG. 5b is a side view of the bracket scaffold 10. FIG. 5b shows the (virtual) rotation axis 55 of the first coupling element 28a on the first carrier 24a. The rotation axis 55 extends in the present case parallel with the curved surface 14 of the structure 12. The first coupling element 28a can be pivoted exclusively about this rotation axis 55 relative to the first carrier 24a. Furthermore, the rotation axis 55 extends in the present case perpendicularly to the first longitudinal axis 26*a* (see also FIG. 2*a*) of the first carrier 24*a*.

The first securing element 22*a* extends with a first abutment face 64*a* parallel with the curved surface 14 of the structure 12. The rotation axis 55 is spaced apart by the spacing X from this first abutment face 64*a*. The spacing X may be between 0 centimetres and 15 centimetres, in particular between 0 centimetres and 10 centimetres, preferably between 0 centimetres and 5 centimetres.

Figure 5C:
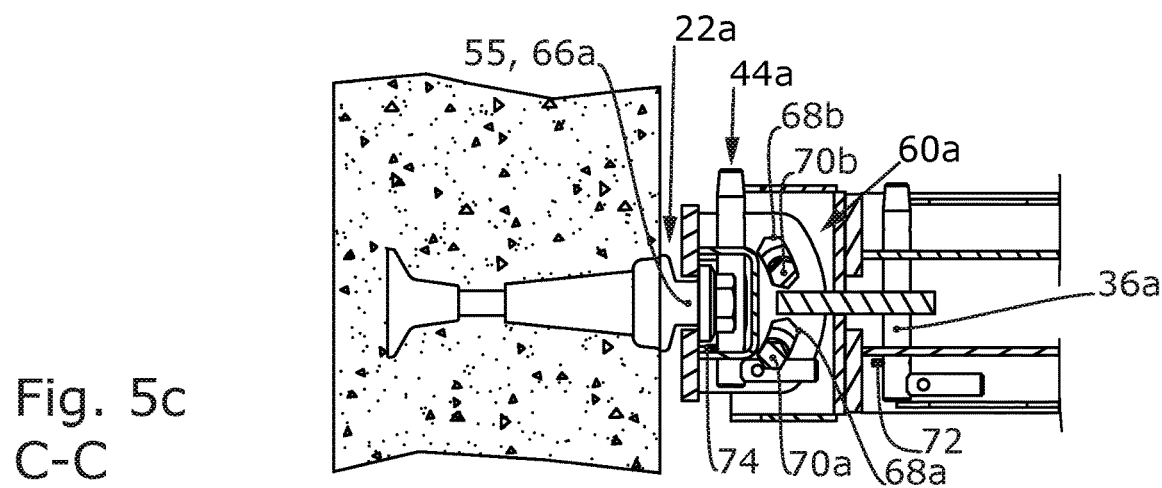
FIG. 5c is a cross-section of the bracket scaffold according to FIG. 5b along the line C-C.

FIG. 5*c* shows the cross-section C-C according to FIG. 5*b*. FIG. 5*c* shows that the first securing element 22*a* has a first narrowing 66*a*, in particular in the form of a radial narrowing, in the region of which the rotation axis 55 is located.

It can further be seen in FIG. 5*c* that the first guide 60*a* is constructed in the form of a slotted guide which has a first slotted member 68*a* and a second slotted member 68*b*. A first guiding member 70*a* is guided in the first slotted member 68*a*. A second guiding member 70*b* is guided in the second slotted member 68*b*. In order to prevent linear abutment, the guiding members 70*a*, 70*b* are each constructed in the form of a polygon, in particular in the form of a hexagon.

FIG. 5*c* further shows that the first adapter socket pin 36*a* has an adapter socket pin projection 72 and the first coupling element socket pin 44*a* has a coupling element socket pin projection 74 in order to enable split-pin-free securing of the first adapter socket pin 36*a* or the first coupling element socket pin 44*a* in the keyhole-shaped first additional opening 48*a* (see FIG. 3) or the keyhole-shaped first coupling element opening 46*a* (see FIG. 3). In the position shown in FIG. 5*c*, the first adapter socket pin 36*a* is retained in the first carrier opening 38*a* (see FIG. 3) by means of clamping of the handle thereof in a pocket (see FIGS. 3 and 5*b*).

Taking all the Figures of the drawings as a whole, the invention in summary relates to a bracket scaffold 10 for arranging on a curved surface 14 of a structure 12. A first securing element 22*a* is arranged on the structure 12. The bracket scaffold 10 has an end-side first coupling element 28*a* which, in particular in a limited manner, is pivotably arranged on a first carrier 24*a* of the bracket scaffold 10. The rotation axis 55 of the first coupling element 28*a* preferably intersects with the support location 54*a* of the first coupling element 28*a* on the first securing element 22*a*. The pivot radius 56 of the first coupling element 28*a* describes in particular a concave pivot arc 58 on the first carrier 24*a*. The rotation axis 55 is preferably located from the first guide 60*a* in the direction of the free end of the first coupling element 28*a*. Extension torques in the articulation which is formed by the first guide 60*a*, as a result of the bracket scaffold 10 being pulled away from the structure 12, are minimized.

What is claimed is:

1. A bracket scaffold for securing to a curved surface of a structure, the bracket scaffold comprising:
   a) a first carrier defining a first end opposite a second end;
   b) a first coupling element which is pivotably arranged on the first carrier at the first end of the first carrier, the first coupling element configured for connecting to a first securing element which can be arranged on the structure;
   c) a first guide disposed at the first end of the first carrier, the first guide pivotably connecting the first coupling element on the first carrier;
   d) wherein the first guide enables concave pivoting of the first coupling element relative to the first carrier, the concave pivoting defining a virtual rotation axis that is located close to the structure which can be connected to the first securing element, and wherein the virtual rotation axis is fixed in position relative to the first carrier during pivoting of the first coupling element; and
   e) wherein the virtual rotation axis is disposed at a distance beyond the first end of the first carrier in a direction opposite from the second end of the first carrier.

2. The bracket scaffold according to claim 1, wherein the bracket scaffold has the following:
   d) a second carrier;
   e) a second coupling element which is arranged on the second carrier for connecting to a second securing element which can be arranged on the structure; and
   f) a second guide for pivoting the second coupling element on the second carrier;
   wherein the second carrier is rigidly connected to the first carrier.

3. The bracket scaffold according to claim 1, wherein the first coupling element has an opened first slotted receiving member for partially receiving the first securing element.

4. The bracket scaffold according to claim 1, wherein the first guide is constructed in a form of a slotted guide having a first slotted member and a first guiding member which is guided in the first slotted member.

5. The bracket scaffold according to claim 1, wherein the first carrier has a first adapter portion and a first bolt, wherein the first coupling element is connected by the first guide to the first adapter portion and the first adapter portion is arranged on the first bolt in a reversibly releasable manner.

6. The bracket scaffold according to claim 1, wherein the first coupling element has a first coupling element socket pin for securing the first securing element to the first coupling element, wherein the first coupling element socket pin can be introduced into a first coupling element opening of the first coupling element.

7. The bracket scaffold according to claim 1, wherein the virtual rotation axis of the first guide is located in a region of the first securing element.

8. The bracket scaffold according to claim 7, wherein the virtual rotation axis of the first guide is located in a support region of the first coupling element on the first securing element.

9. The bracket scaffold according to claim 8, wherein the first coupling element has an opened first slotted receiving member for partially receiving the first securing element.

10. The bracket scaffold according to claim 9, wherein the first guide is constructed in a form of a slotted guide having a first slotted member and a first guiding member which is guided in the first slotted member.

11. The bracket scaffold according to claim 10, wherein the first guide has a second slotted member and a second guiding member which is guided in the second slotted member.

12. The bracket scaffold according to claim 11, wherein the first guiding member is partially in abutment with the first slotted member in a planar manner and the second guiding member is partially in abutment with the second slotted member in a planar manner.

13. The bracket scaffold according to claim 12, wherein the first guiding member is constructed in the region of the first slotted member in cross-section in the form of a polygon and the second guiding member is constructed in the region of the second slotted member in cross-section in a form of a polygon.

14. The bracket scaffold according to claim 13, wherein the first carrier has a first adapter portion and a first bolt, wherein the first coupling element is connected by the first guide to the first adapter portion and the first adapter portion is arranged on the first bolt in a reversibly releasable manner.

15. The bracket scaffold according to claim 14, wherein the first adapter portion is connected by a first socket pin connection to the first bolt, wherein the first socket pin connection has a first adapter socket pin which can be introduced into a first carrier opening.

16. The bracket scaffold according to claim 15, wherein the first coupling element has a first coupling element socket pin for securing the first securing element to the first coupling element, wherein the first coupling element socket pin can be introduced into a first coupling element opening of the first coupling element.

17. The bracket scaffold according to claim 16, wherein the bracket scaffold has the following:
   d) a second carrier;
   e) a second coupling element which is arranged on the second carrier for connecting to a second securing element which can be arranged on the structure;
   f) a second guide for concave pivoting the second coupling element on the second carrier, wherein a rotation axis of the second guide is located close to the structure which can be connected to the second securing element; and
   wherein the second carrier is rigidly connected to the first carrier.

18. A method for arranging a bracket scaffold on a structure having a first securing element, the method comprising the steps of:
   providing the bracket scaffold having a first carrier defining a first end opposite a second end, a first coupling element which is pivotably arranged on the first carrier at the first end of the first carrier, and a first guide disposed at the first end of the first carrier, the first guide pivotably connecting the first coupling element on the first carrier, wherein the first guide enables a concave pivoting of the first coupling element relative to the first carrier, the concave pivoting defining a virtual rotation axis that is located close to the structure which can be connected to the first securing element, and wherein the virtual rotation axis is fixed in position relative to the first carrier during pivoting of the first coupling element, and wherein the virtual rotation axis is disposed at a distance beyond the first end of the first carrier in a direction opposite from the second end of the first carrier; and
   pressing the bracket scaffold onto the structure so that the first coupling element is orientated towards the surface of the structure, wherein the virtual rotation axis of the first guide is located in the region of the free end of the first coupling element.

19. The method according to claim 18, including the method step of lowering the bracket scaffold with the first securing element being partially received in the first coupling element.

20. A bracket scaffold for securing to a curved surface of a structure, the bracket scaffold comprising:
   a) a first carrier;
   b) a first coupling element which is pivotably arranged on the first carrier for connecting to a first securing element which can be arranged on the structure;
   c) a first guide for pivotably connecting the first coupling element on the first carrier;
   d) wherein the first guide is constructed for a concave pivoting of the first coupling element on the first carrier, the concave pivoting defining a virtual rotation axis that is located close to the structure which can be connected to the first securing element, and wherein the virtual rotation axis is fixed in position relative to the first carrier during pivoting of the first coupling element;
   e) wherein from a perspective of a portion of the first carrier faced away from the first coupling element a pivot arc about the virtual rotation axis is constructed in a concave manner relative to the first carrier; and
   f) wherein the first coupling element has an opened first slotted receiving member for partially receiving the first securing element.

21. A bracket scaffold for securing to a curved surface of a structure, the bracket scaffold comprising:
   a) a first carrier;
   b) a first coupling element which is pivotably arranged on the first carrier for connecting to a first securing element which can be arranged on the structure;
   c) a first guide for pivotably connecting the first coupling element on the first carrier;
   d) wherein the first guide is constructed for a concave pivoting of the first coupling element on the first carrier, the concave pivoting defining a virtual rotation axis that is located close to the structure which can be connected to the first securing element, and wherein the virtual rotation axis is fixed in position relative to the first carrier during pivoting of the first coupling element;
   e) wherein from a perspective of a portion of the first carrier faced away from the first coupling element a pivot arc about the virtual rotation axis is constructed in a concave manner relative to the first carrier; and
   f) wherein the first carrier has a first adapter portion and a first bolt, wherein the first coupling element is connected by the first guide to the first adapter portion and the first adapter portion is arranged on the first bolt in a reversibly releasable manner.

* * * * *